United States Patent
Ziech et al.

(10) Patent No.: US 7,090,609 B2
(45) Date of Patent: Aug. 15, 2006

(54) PINION SUPPORT FOR A DIFFERENTIAL ASSEMBLY

(75) Inventors: James F. Ziech, Kalamazoo, MI (US); Leo Wenstrup, Portage, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/637,393

(22) Filed: Aug. 8, 2003

(65) Prior Publication Data

US 2005/0032600 A1    Feb. 10, 2005

(51) Int. Cl.
F16H 48/06    (2006.01)

(52) U.S. Cl. ................................ 475/220; 475/230

(58) Field of Classification Search ............... 475/331, 475/346, 220, 230; 384/247–249
See application file for complete search history.

(56) References Cited

U.S. PATENT DOCUMENTS

| | | | |
|---|---|---|---|
| 904,774 A | 11/1908 | Gulick | |
| 1,241,893 A | 10/1917 | Alden | |
| 1,536,824 A | 5/1925 | Domizi | |
| 1,744,179 A | 1/1930 | Tibbetts | |
| 1,749,964 A * | 3/1930 | Altgelt | 475/230 |
| 1,828,025 A * | 10/1931 | Church | 475/246 |
| 2,219,025 A * | 10/1940 | Vanderberg | 475/246 |
| 2,578,155 A * | 12/1951 | Slider | 475/246 |
| 2,651,216 A * | 9/1953 | Alden | 475/247 |
| 4,004,472 A | 1/1977 | Millward et al. | |
| 4,402,238 A * | 9/1983 | Craig | 475/230 |
| 5,597,242 A * | 1/1997 | Beeler | 384/517 |
| 5,913,745 A | 6/1999 | Inagaki et al. | |
| 6,015,264 A | 1/2000 | Violette et al. | |
| 6,024,666 A | 2/2000 | Bunnow | |
| 6,200,241 B1 | 3/2001 | Pinotti et al. | |
| 6,544,140 B1 * | 4/2003 | Gradu et al. | 475/246 |
| 6,719,661 B1 * | 4/2004 | Turner et al. | 475/230 |
| 2003/0083171 A1 | 5/2003 | Turner et al. | |

FOREIGN PATENT DOCUMENTS

EP    1 348 589 A2    10/2003
GB        743027 B1    1/1956

OTHER PUBLICATIONS

Interntional Search Report dated Dec. 22, 2004 (3 pages).

* cited by examiner

*Primary Examiner*—Roger Pang
(74) *Attorney, Agent, or Firm*—Rader, Fishman & Grauer PLLC

(57) ABSTRACT

A differential assembly includes a yoke, attached to a drive shaft, for driving a pinion head. The differential assembly further includes inner and outer pinion bearing assemblies, a separable mounting plate, and a cavity defined by a housing for receiving a pinion assembly. The outer pinion bearing assembly is integrally mounted to the housing, while the inner pinion bearing assembly is secured to the separable mounting plate. The pinion head is straddle mounted between the inner and outer pinion bearing assemblies.

9 Claims, 3 Drawing Sheets

PINION SUPPORT FOR A DIFFERENTIAL ASSEMBLY

TECHNICAL FIELD

The present invention relates to an improved pinion support for a differential assembly and in particular to a pinion support for a straddle mount single drive axle.

BACKGROUND OF THE INVENTION

Differentials are utilized in the drive lines of many modern vehicles. Typically, a differential takes a rotating input and drives two shafts which extend in opposed directions. The differential allows the two shafts to rotate at varying speeds relative to each other.

SUMMARY OF THE INVENTION

The present invention relates to a differential assembly comprising a yoke, attached to a drive shaft, for driving a pinion head. The differential assembly further includes inner and outer pinion bearing assemblies, a separable mounting plate, and a cavity defined by a housing for receiving a pinion assembly. The outer pinion bearing assembly is integrally mounted to the housing, while the inner pinion bearing assembly is secured to the mounting plate. The pinion head is straddle mounted between the inner and outer pinion bearing assemblies.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
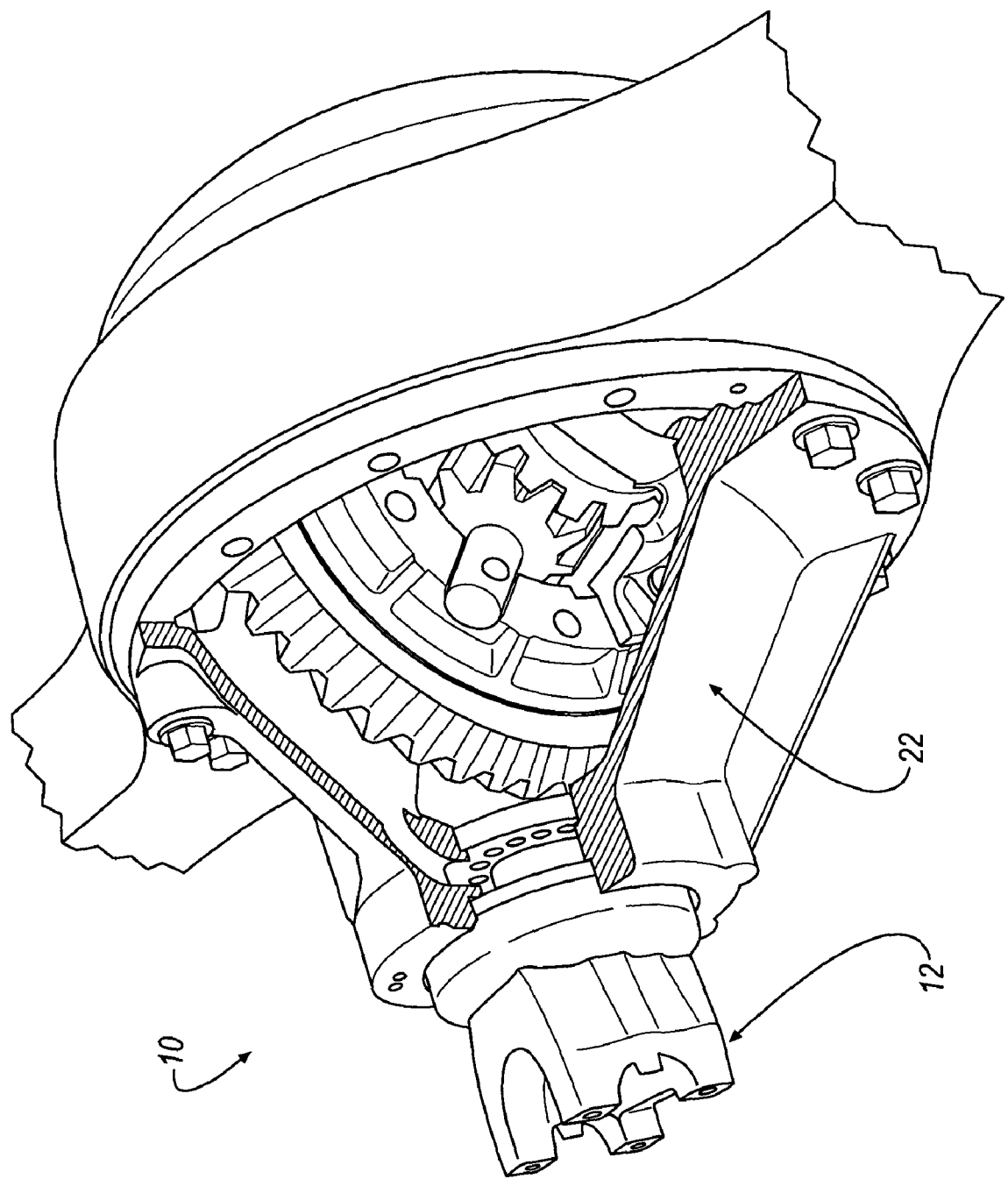
FIG. 1 is a perspective view of a differential assembly assembled within a vehicle in accordance with the present invention.
Figure 2:
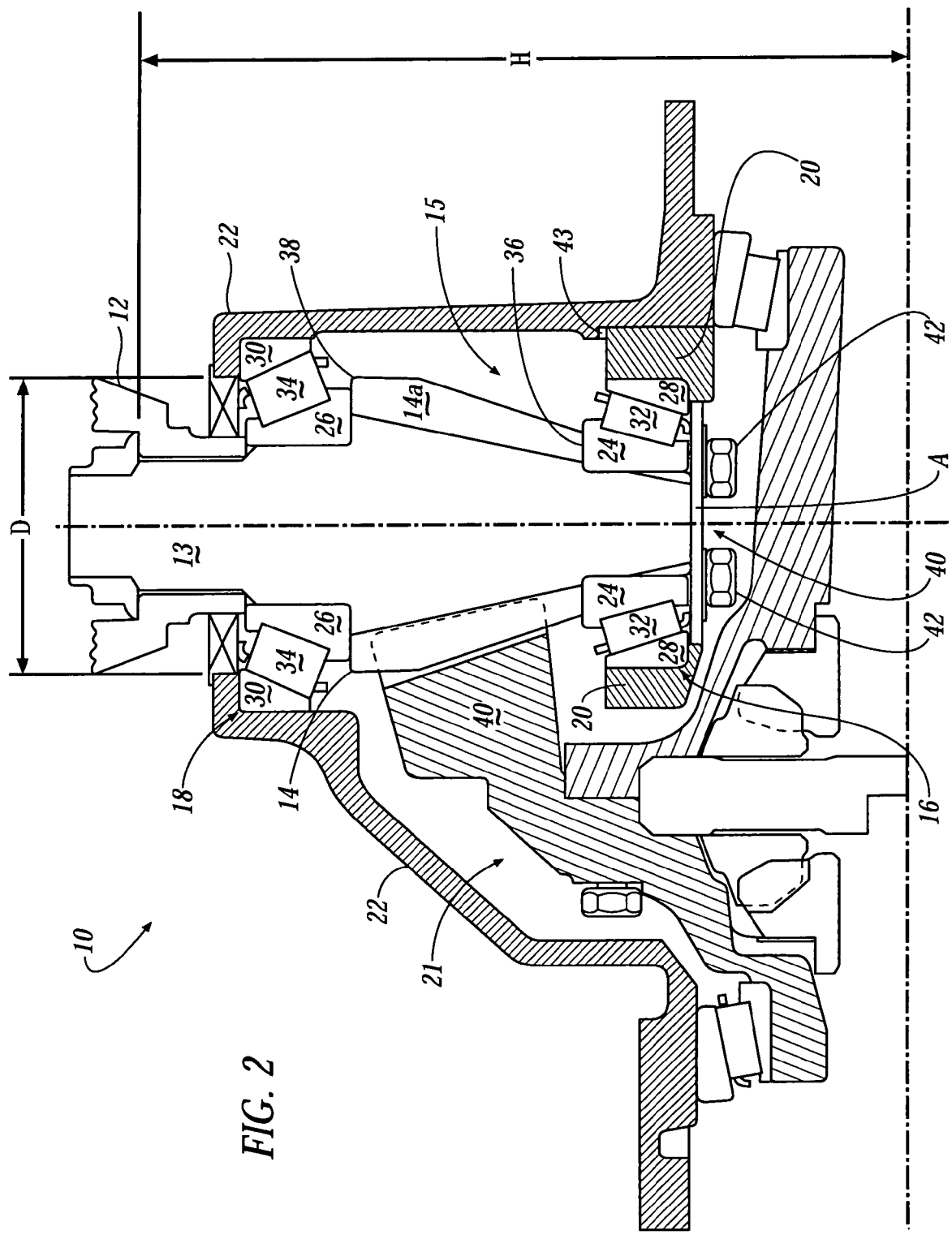
FIG. 2 is a cross-sectional view of a differential assembly according to an embodiment of the present invention.
Figure 3:
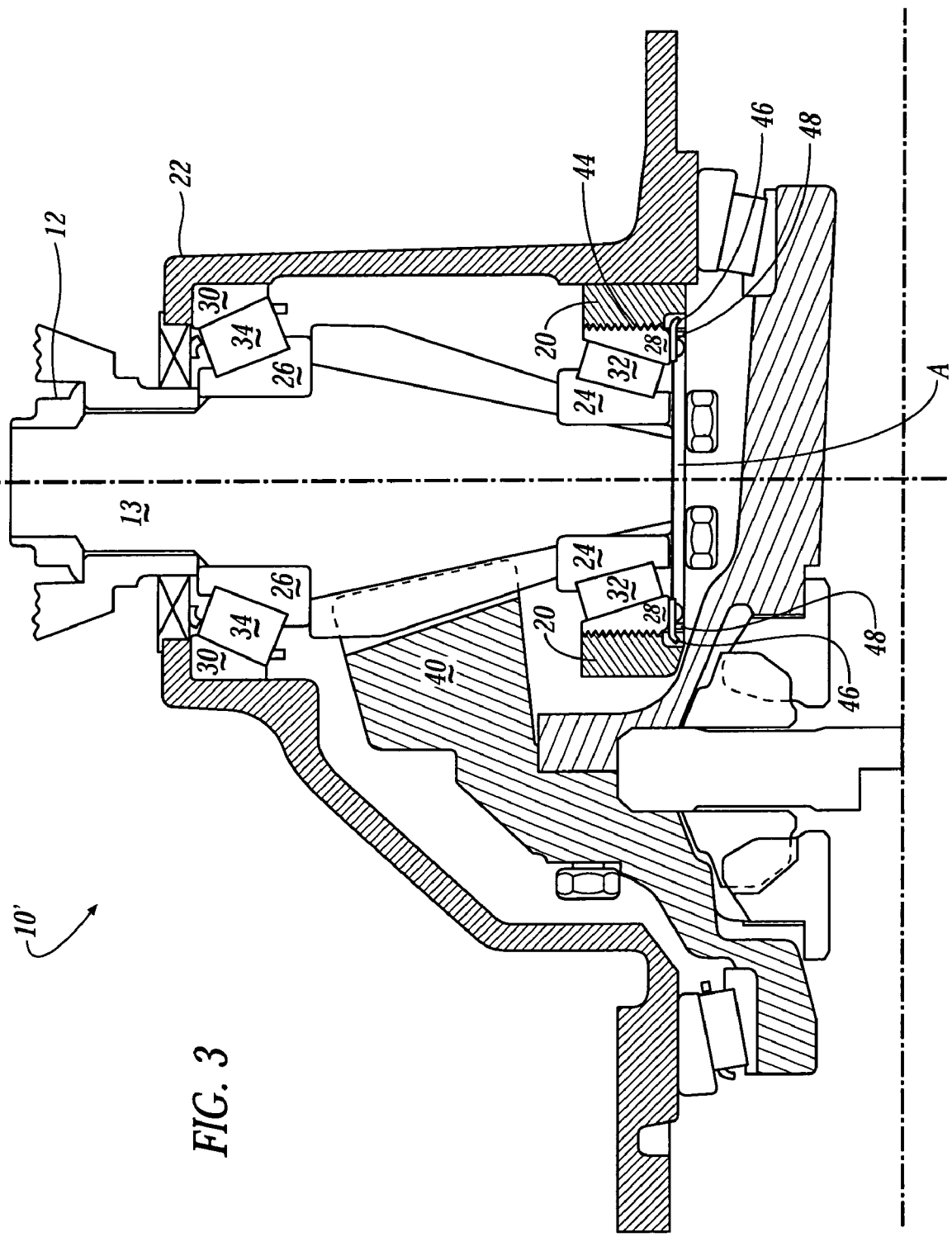
FIG. 3 is a cross-sectional view of a differential assembly according to an alternate embodiment of the present invention.

Referring to FIG. 1, a differential assembly 10 is shown assembled within a vehicle 11. Focusing on FIG. 2, the differential assembly 10 is illustrated in accordance with the present invention. The differential assembly 10 comprises a yoke 12 attached to a drive shaft 13, for driving a pinion head 14. The differential assembly 10 further includes a pinion assembly 15. Pinion assembly 15 includes gear teeth 14a, inner and outer pinion bearing assemblies 16, 18 and shaft 13. Pinion assembly 15 is received within a cavity 21 defined by a housing 22; housing 22 is fixed against rotation. Inner pinion bearing assembly 16 of pinion assembly 15 is secured to a separable mounting plate 20. Mounting plate 20 is illustrated in FIGS. 2 and 3 to include an aperture A.

Pinion head 14 is straddle mounted between inner and outer pinion bearing assemblies 16, 18 to achieve optimum support. Pinion head 14 is directly mounted to drive shaft 13 and supported on either side by the two axially spaced pinion bearing assemblies 16, 18. Inner pinion bearing assembly 16 supports the portion of the drive shaft 13 which is located within housing 22. Outer pinion bearing assembly 18 supports the portion of the drive shaft 13 with which the vehicle drive shaft is normally associated. Straddle mounting pinion head 14 between inner and outer pinion bearing assemblies 16,18 decreases the number of bearing assemblies found in conventional differential assemblies by allowing pinion head 14 to be optimally supported. Furthermore, lubrication to the inner and outer pinion bearing assemblies 16, 18 is provided without the need for extra oil channels, thus reducing the complexity of the differential assembly 10.

Inner and outer pinion bearing assemblies 16, 18 each further comprise an inner race 24, 26, an outer race 28, 30 and a bearing 32, 34, respectively. The bearings 32, 34 are disposed between inner races 24, 26 and outer races 28, 30. Inner race 24 of inner pinion bearing assembly 16 abuts a face 36 of gear teeth 14a of pinion head 14. Inner race 26 of outer pinion bearing assembly 18 abuts a face 38 of gear teeth 14a of pinion head 14. Outer race 28 of inner pinion bearing assembly 16 is mounted on the separable mounting plate 20, while outer race 30 of outer pinion hearing assembly 18 is integrally mounted to housing 22.

By mounting outer race 30 of outer pinion bearing assembly 18 directly to housing 22, outer pinion bearing assembly 18 provides a more rigid structure for supporting pinion head 14 than conventional differential assemblies. In addition, the pinion head 14 mounting distance can be readily machined to tolerance through machining housing 22 where outer race 30 abuts housing 22. Accordingly, outer pinion bearing assembly 18 can be assembled into differential assembly 10 without the use of shims or a shim pack, resulting in weight savings and cost reduction over conventional differential assemblies.

Moreover, attaching outer pinion bearing assembly 18 directly to housing 22 eliminates the need for a pinion bearing cage, or external adjuster, as found in conventional differential assemblies. Typically, bearing cages create an additional path for oil to leak out of the housing 22. Therefore, by removing the need for a bearing cage, an additional path for oil to leak through does not exists.

Furthermore, removal of the bearing cage reduces the yoke standout dimension H. The reduced yoke standout dimension H decreases the amount of space required for differential assembly 10 within vehicle 11. Additionally, the reduced yoke standout dimension H provides a significant advantage for short wheelbase vehicles drive line angles (not shown) and for tandem axle inter axle dive line angles (not shown).

By way of example, and without limitation, FIGS. 2 and 3 illustrate outer pinion bearing assembly 18 as being larger than inner pinion bearing assembly 16. Generally, outer pinion bearing assemblies substantially bear the load of the pinion head within differential assemblies. Consequently, outer pinion bearing assemblies are normally larger than inner pinion bearing assemblies. However, it can be appreciated that inner and outer pinion bearing assemblies 16, 18 may be of substantially the same dimensions. Additionally, bearings 32, 34 may be symmetrically shaped, as shown in FIG. 1, or bearings 32, 34 may be tapered at one end.

Inner pinion bearing assembly 16 is mounted on a separable mounting plate 20. FIGS. 2 and 3 illustrate embodiments in which mounting plate 20 may be attached and removed from housing 22 through a series of bolts 42. It can be appreciated that the present invention can be practiced with any number of bolts to secure separable mounting plate 20 to housing 22. However, the present invention is not limited to the use of bolts for securing separable mounting plate 20 to housing 22. For example, mounting plate 20 may be secured to housing 22 through an adhesive, or by a snap-fit design. FIG. 2 depicts one method to set pinion assembly 15 bearing preload for inner and outer pinion bearing assemblies 16 and 18. To set inner and outer pinion bearing assemblies 16 and 18 preload, a shim pack 43 may be placed under the mounting plate 20 of the inner pinion bearing assembly 16.

The pinion assembly 15 may be received into cavity 21 from rear portion 40 of housing 22. Currently, pinion assemblies are received into cavity 21 of housing 22 through an opening defined by dimension D. Therefore, dimension D must be broad enough to accommodate the widest portion of pinion assembly15. However, with pinion assembly 15 being assembled through rear portion 40 of housing 22, dimension D may be decreased. The result is a more compact housing 22. Moreover, the structural integrity of housing 22 is improved due to the reduced size of opening D. Additionally, the need for separable covers or bearing carriers is eliminated along with the associated added cost and potential for oil leakage.

FIG. 3 depicts an alternate embodiment of the present invention. Differential assembly 10' substantially incorporates the features of differential assembly 10 of FIG. 1. However, outer race 28 of inner pinion bearing assembly 16 has a threaded cup 44. Outer race 28 of inner pinion bearing assembly 16 may be threaded to a desired position to preload inner and outer pinion bearing assemblies 16 and 18. Consequently, threaded cup 44 removes the need for a shim pack 43 to preload inner and outer pinion bearing assemblies 16 and 18.

Furthermore, inner pinion bearing assembly 16 may include a lock ring 46 and a stake 48. The lock ring may be riveted to threaded cup 44 and attached to the stake to prevent the threaded cup 44 from rotating once the preload has been set. It should be noted however that the present invention is not limited to a lock ring and stake to prevent the threaded cup from rotating. By way of example, and without limitation, the threaded cup 44 may be coated with an adhesive to prevent rotation once the preload has been established.

While the invention has been specifically described in connection with certain specific embodiments thereof, it is to be understood that this is by way of illustration and not of limitation, and the scope of the appended claims should be construed as broadly as the prior art will permit.

What is claimed is:

1. A differential assembly comprising:
 a yoke, attached to a drive shaft, for driving a pinion head;
 inner and outer pinion bearing assemblies;
 a separable mounting plate, the mounting plate being secured to the inner pinion bearing assembly;
 a cavity defined by a housing for receiving a pinion assembly;
 wherein the outer pinion bearing assembly is integrally mounted within the housing, the inner pinion bearing assembly includes an adjusting mechanism to selectively adjust an axial bearing preload on at least one of said inner and outer pinion bearing assemblies, the adjusting mechanism includes the mounting plate, the mounting plate is selectively moveable relative to the housing, and wherein the pinion assembly is straddle mounted between the inner and outer pinion bearing assemblies.

2. A differential assembly according to claim 1, wherein the mounting plate of the inner pinion bearing assembly is secured to the housing by at least one bolt.

3. A differential assembly according to claim 1, wherein the inner and outer pinion bearing assemblies each further comprise an inner race, an outer race and a bearing disposed between the inner and outer races.

4. A differential assembly according to claim 1, wherein the adjusting mechanism includes at least one shim pack, and wherein the mounting plate may be shimmed by said at least one shim pack being disposed under the mounting plate.

5. A differential assembly according to claim 1, wherein a mounting distance for the pinion head may be established by machining the housing.

6. A differential assembly comprising:
 a carrier housing having a first opening and a second opening;
 an outer pinion bearing assembly integrally mounted within said carrier housing at said first opening;
 an inner pinion bearing assembly positioned at said second opening;
 a pinion assembly having a pinion mounted between said outer pinion bearing and said inner pinion bearing;
 wherein said inner pinion bearing is fixed to a removable support plate at said second opening of said carrier housing, at least a portion of said pinion assembly extends through said first opening, said pinion assembly is not installed through said first opening, the removable support plate may be shimmed by at least one shim rack disposed under the removable support plate, and wherein said pinion assembly is installed through said second opening.

7. A differential assembly as recited in claim 6, wherein a removable mounting plate of the inner pinion bearing assembly is fixed to said housing by at least one bolt.

8. A differential assembly as recited in claim 6, wherein the inner and outer pinion bearing assemblies each further include an inner race, an outer race and a bearing disposed between the inner and outer races.

9. A differential assembly as recited in claim 6, wherein said pinion assembly includes a pinion head, and a mounting distance for the pinion head may be established by machining the carrier at the first opening.

* * * * *